US010076823B2

(12) United States Patent
Eliason et al.

(10) Patent No.: US 10,076,823 B2
(45) Date of Patent: Sep. 18, 2018

(54) WET ABRASIVE BLASTING SYSTEM AND METHOD

(71) Applicant: Graco Minnesota Inc., Minneapolis, MN (US)

(72) Inventors: Keith Eliason, Virginia Beach, VA (US); Nicolas K. Studt, Roberts, WI (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/899,737

(22) Filed: Feb. 20, 2018

(65) Prior Publication Data

US 2018/0169835 A1   Jun. 21, 2018

Related U.S. Application Data

(63) Continuation-in-part of application No. 13/080,880, filed on Apr. 6, 2011, now Pat. No. 9,925,642.

(Continued)

(51) Int. Cl.
*B24C 3/00* (2006.01)
*B24C 7/00* (2006.01)
(Continued)

(52) U.S. Cl.
CPC ............ *B24C 7/0015* (2013.01); *B24B 57/02* (2013.01); *B24C 5/04* (2013.01); *B24C 7/003* (2013.01);
(Continued)

(58) Field of Classification Search
CPC ... B24C 7/0015; B24C 7/0038; B24C 7/0076; B24C 7/003; B24C 5/04; B24B 57/02; F16K 15/026; F16K 17/06; B05B 7/144
See application file for complete search history.

(56) References Cited

U.S. PATENT DOCUMENTS 3,385,005 A * 5/1968 Nielsen .................... B24C 3/34
134/102.3
3,626,977 A * 12/1971 Riley .................... F16K 15/028
137/516.25
(Continued)

FOREIGN PATENT DOCUMENTS

DE        4335382 A1 * 4/1995 ........... B24C 7/0007
EP        0122928 B1 * 1/1989 ............... B24C 5/04
(Continued)

OTHER PUBLICATIONS

Constance, John D., Finding Equivalent Pipe Lengths . . . of Valves . . . , May 2006.*
(Continued)

*Primary Examiner* — Marc Carlson
(74) *Attorney, Agent, or Firm* — Bernard G. Pike; Pike IP Law, PLLC

(57) ABSTRACT

Wet abrasive blasting systems are described that have a slurry piping system and a gas piping system that have pipes and other piping components, such as valves and regulators, that have a more consistent internal cross-sectional area than conventional wet abrasive blasting systems. The more consistent flow area provides astonishing improvements in blasting efficiency and consistent and predictable slurry flow rates.

14 Claims, 2 Drawing Sheets

Related U.S. Application Data

(60) Provisional application No. 61/363,818, filed on Jul. 13, 2010.

(51) Int. Cl.
| | | |
|---|---|---|
| *B24C 5/04* | (2006.01) | |
| *B24B 57/02* | (2006.01) | |
| *F16K 15/02* | (2006.01) | |
| *B05B 7/14* | (2006.01) | |
| *F16K 17/06* | (2006.01) | |

(52) U.S. Cl.
CPC .......... *B24C 7/0038* (2013.01); *B24C 7/0076* (2013.01); *B05B 7/144* (2013.01); *F16K 15/026* (2013.01); *F16K 17/06* (2013.01)

(56) References Cited

U.S. PATENT DOCUMENTS

| | | | | |
|---|---|---|---|---|
| 3,768,210 | A * | 10/1973 | Johnson | B24C 7/0046 451/101 |
| 3,914,815 | A * | 10/1975 | Kobayashi | B24C 3/327 15/3.5 |
| 4,172,465 | A * | 10/1979 | Dashner | F16K 15/063 137/533.27 |
| 4,304,255 | A * | 12/1981 | Prince | F16K 15/033 137/527.4 |
| 4,689,923 | A * | 9/1987 | Goudeaux | B24C 7/00 451/99 |
| 5,065,551 | A * | 11/1991 | Fraser | B05B 7/1431 451/40 |
| 5,201,150 | A * | 4/1993 | Kuboyama | B24C 7/0038 451/100 |
| 5,404,904 | A * | 4/1995 | Glaser | F16K 17/06 137/539 |
| 6,224,463 | B1 * | 5/2001 | Hartzell, Jr. | B24C 5/02 451/40 |
| 6,248,004 | B1 * | 6/2001 | Rooney, Sr. | B24C 1/003 423/349 |
| 7,033,256 | B2 * | 4/2006 | Miller | B24C 7/0007 251/175 |
| 7,980,919 | B2 * | 7/2011 | Zhou | B24B 57/02 451/101 |
| 2006/0128282 | A1 * | 6/2006 | Grechishkin | B24C 5/00 451/75 |
| 2008/0299876 | A1 * | 12/2008 | Zhou | B24B 57/02 451/94 |
| 2010/0252120 | A1 * | 10/2010 | Delves | B65D 90/626 137/2 |
| 2013/0324016 | A1 * | 12/2013 | Eliason | B24C 7/0038 451/101 |
| 2015/0105001 | A1 * | 4/2015 | Eliason | B24C 7/0053 451/40 |
| 2017/0348824 | A1 * | 12/2017 | Skross | B24C 1/08 |
| 2018/0021923 | A1 * | 1/2018 | McIntyre | B24C 7/0038 |

FOREIGN PATENT DOCUMENTS

| | | | | |
|---|---|---|---|---|
| GB | 2230211 A | * | 10/1990 | ........... B24C 7/0007 |
| WO | WO 8401738 A1 | * | 5/1984 | ............... B24C 5/04 |
| WO | WO 0051787 A1 | * | 9/2000 | ........... B24C 7/0007 |

OTHER PUBLICATIONS van Ormer, Hank et al., Compressed Air Systems—The Secret is in the Pipe, May 2005.*
Bensinger, Floyd, "Check Valve Sizing and Selection", May 14, 2009.*
Mao Qing et al., "Orifice-induced Wall Pressure Fluctuations and Pipe Vibrations: Theory and Modeling of Fluid Excitations", Jan. 20, 2006.*
Apollo Valves, "Check Valve Catalog", Nov. 28, 2012.*
Mao Qing et al. "Orifice-Induced Wall Pressure Fluctuations and Pipe Vibrations: Theory and Modeling of Fluid Excitations", Jan. 20, 2006.
Apollo Valves, "Check Valves Catalog", Nov. 28, 2012.
Floyd Bensinger, "Check Valve Sizing and Selection", May 14, 2009.
van Ormer, Hank et al. "Compressed Air Systems: The Secret is in the Pipe", May 2005.
Constance, John D. "Finding Equivalent Pipe Lengths . . . of Valves, section changes, and miter bends", May 2006.

* cited by examiner

WET ABRASIVE BLASTING SYSTEM AND METHOD

RELATED APPLICATION

This patent applications claims priority under 35 U.S.C. § 120 as a continuation-in-part application to U.S. patent application Ser. No. 13/080,880 filed on Apr. 6, 2011 which claims priority under 35 U.S.C. § 119 to U.S. Provisional Patent Application Ser. No. 61/363,818 filed on Jul. 13, 2010 which is incorporated by reference in its entirety.

FIELD OF THE INVENTION

The invention is directed to abrasive blasting systems for cleaning, preparing surfaces, removing coatings, and other abrasive blasting operations. Embodiments of the wet abrasive blasting system and methods provide consistent flow of air, water and abrasive as compared to conventional wet blasting systems.

BACKGROUND

To remove the paint, dirt or other surface coating from a substrate such as a surface to be painted or cleaned, a blasting system is both desirable and necessary. There are a variety of blasting processes for these purposes, including but not limited to, water blasting, dry abrasive blasting, and wet abrasive blasting. In certain applications, abrasive blasting systems are able to efficiently clean or remove a coating without damaging the underlying metal or other substrate. Although in other applications, a certain degree of surface roughening may be desired.

The use of dry abrasive blasting with particles such as those used in conventional sand blasting may result in surface roughness and other damage to the substrate. Typical blast particles are hard and abrasive in order to increase the efficiency of the blasting operation but may therefore result in damage to the substrate. Soft recyclable blast particles are sometimes substituted to avoid surface damage. These recyclable blast particles include, but are not limited to, agricultural products such as crushed walnut shells, crushed pistachio shells, and rice hulls. Plastic particles are sometimes used to reduce substrate surface damage but may also result in a reduction in efficiency of the blasting operation.

Wet abrasive systems have been used to also control surface damage. Wet abrasive systems combine the benefits of these blasting systems and dry abrasive blasting systems. In wet abrasive blasting, the fluid may encapsulate the abrasive media to simultaneously add mass to the abrasive and buffer the impact of the abrasive against the substrate to reduce potential surface damage but still effectively strip or clean the surface while also reducing the dust produced compared to a dry abrasive blasting system. However, wet abrasive systems require efficient mixing of slurry and a gas stream, to produce a consistent stream of a three-phase mixture of fluid, solid abrasive, and gas stream. If the mixing of slurry and pressurized gas is not well controlled, the blasting process is less efficient and the benefits of a wet abrasive system are not fully realized.

There is a need for a wet abrasive system that is easier to control in order that the benefits of a wet abrasive system are more fully realized.

SUMMARY

Embodiments of wet abrasive blasting systems comprise a mixer, slurry piping system that connects a source of pressurized slurry to the mixer and a gas piping system that connects a source of pressurized gas to the mixer. The pressurized gas piping system may comprise pipes and other components; wherein a portion of the pipe has an internal cross-sectional flow area and the other components have an internal cross-sectional flow area that is substantially similar to the internal cross-sectional area of the pipe. The slurry piping system may also comprise pipes and other components; wherein a portion of the pipe has an internal cross-sectional flow area and the other components have an internal cross-sectional flow area that is substantially similar to the internal cross-sectional area of the pipe.

Other aspects and features of embodiments of the wet abrasive blasting systems and piping systems will become apparent to those of ordinary skill in the art, upon reviewing the following description of specific, exemplary embodiments of the present invention in concert with the figures. While features may be discussed relative to certain embodiments and figures, all embodiments can include one or more of the features discussed herein. While one or more particular embodiments may be discussed herein as having certain advantageous features, each of such features may also be integrated into various other of the embodiments of the invention (except to the extent that such integration is incompatible with other features thereof) discussed herein. In similar fashion, while exemplary embodiments may be discussed below as system or method embodiments it is to be understood that such exemplary embodiments can be implemented in various systems and methods.

DESCRIPTION OF EMBODIMENTS OF THE INVENTION

Figure 1:
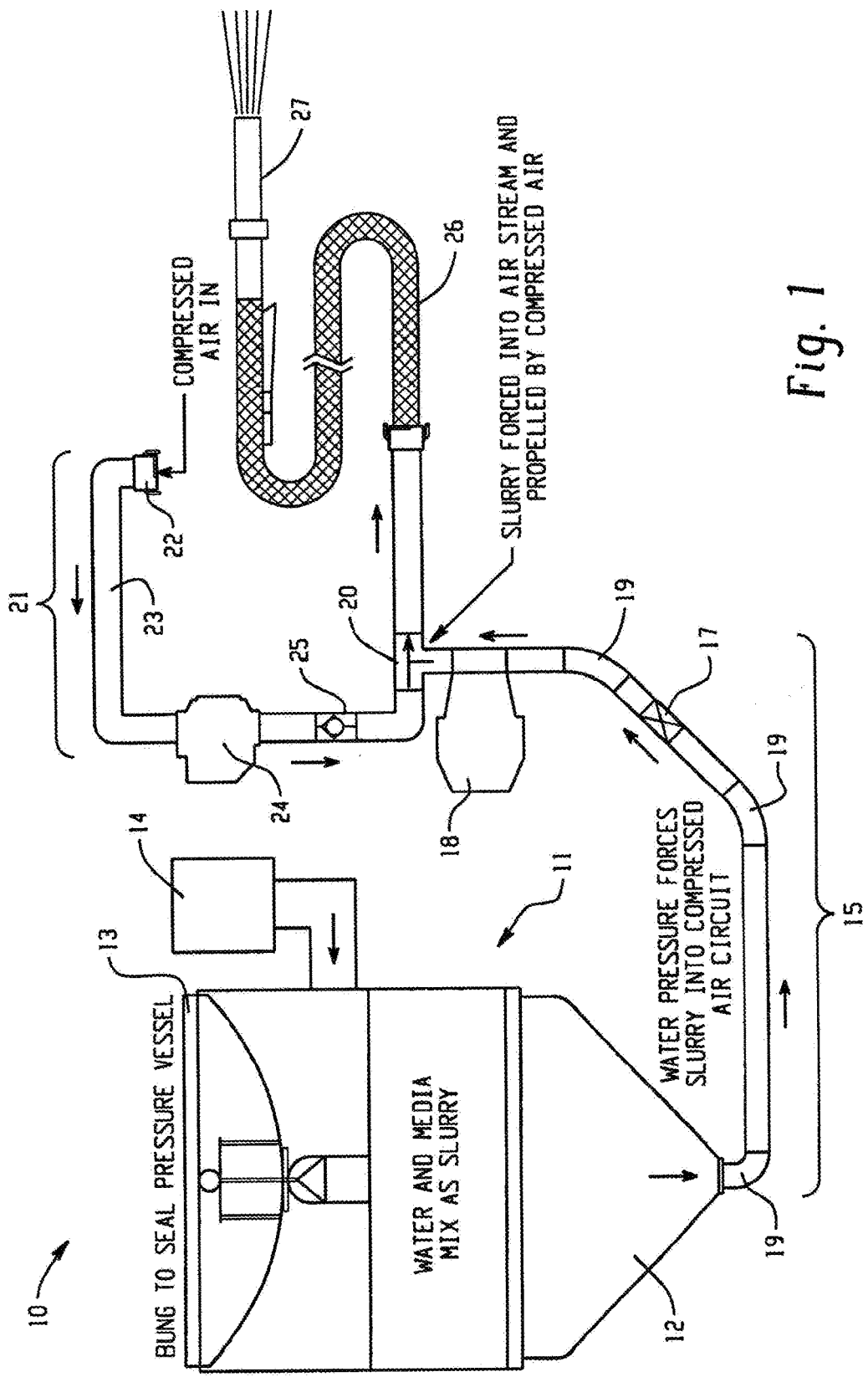
FIG. 1 is a schematic of wet abrasive blasting system.

Embodiments of the wet abrasive blasting system comprise a unique piping system. The piping system allows greater control and consistency of the mixing of the gas and slurry, resulting in a more consistent flow of the three-phase blasting stream and more efficient wet blasting process. The piping system results in mixing of the slurry and pressurized gas in more consistent ratios than conventional wet abrasive blasting systems. In one embodiment, the wet abrasive blasting system comprises a piping system wherein all of the components of the individual piping systems have similar internal cross-sectional flow areas as the cross-sectional area of the pipe in the piping systems. The individual piping systems of a wet abrasive blasting system include, but are not limited to, a slurry piping system and a gas piping system. The piping systems of embodiments of the wet abrasive system are designed to limit pressure fluctuations and to provide consistent flow of gas and slurry to the mixer. In the blasting system, a pressured slurry stream is forced into pressurized gas streams in a mixer. There are various designs of mixer, but in many cases, the mixer may simply be a piping tee with slurry entering one inlet and gas entering a second inlet and the combined slurry and gas stream exiting together through the third connection.

There exists a significant problem with the design of the piping systems of conventional wet blasting systems. These problems result in fluctuating pressures, inefficient slurry delivery, and inefficient substrate cleaning. Piping systems on conventional wet blast systems comprise pipe and piping components that have varying internal cross-sectional areas. For typical piping systems, the variation of the internal cross-sectional area does not significantly affect the downstream processes. In fact, typical piping components are "undersized" (having a smaller internal cross-sectional area) compared to the piping for which it was designed. However, wet abrasive systems include the mixing of slurry and a gas stream to form a three-phase blasting system. The inventor has found that to produce an efficient and consistent flow of the three-phase blasting stream, a more careful and considered design is required. For example, the inventor has discovered that in conventional blasting systems, the design of the slurry and gas piping systems are not sufficient for effectively and consistently mixing a slurry and gas. Such conventional piping systems result in expansion and contraction of the fluid and gas. The expansion and contraction primarily occurs as the slurry and gas pass from an area of one cross-sectional flow area to a larger or smaller cross-sectional flow area. This results in significant fluctuations of pressure of the slurry and gas at the mixer. The pressure fluctuations at the mixer result in variation in the ratio of slurry entering the tee and inconsistent composition of the three-phase blasting system. At certain times, the slurry flow and/or the gas then may completely stop, resulting in only gas entering the tee and thus exiting the tee into the blast hose. With only gas entering the blast hose, the back pressure at the tee is reduced and a slug of slurry may again enter the tee and exit into the blast hose to the nozzle. The back pressure at the tee is then increased again due to the slug of slurry in the hose and flowing through the nozzle, which may reduce or stop the slurry flow. This cycling of slurry flow may continue throughout the blasting process. Such oscillations cause inconsistent performance of the blasting system, an inefficient cleaning process, and significant operator fatigue and frustration.

In contrast, embodiments of the wet abrasive blasting system described herein provide a smooth, consistent, predictable, and controlled flow of both pressurized gas and slurry and produces far less fatigue to the operator than conventional dry-blast systems. Thus, the wet abrasive blasting system in safer to use (both, for the operator and the environment).

As used herein, "pipe" shall mean any fluid containment device used to convey liquid or gas, such as a tube, hose, duct, pipe, or other similar structure. The pipe may have any cross-sectional shape, including rectangular, square, circular, or other shape. The flow area of the pipe is defined by its internal cross-sectional area.

As used herein, "piping system" shall mean pipe and other components used to connect one part of a system to another. The other components may include, but are not limited to, valves, check valves, elbows, tees, reducers, regulators, connectors, gauges or gauge connectors, flow or temperature sensors, pressure gauges, and control valves.

As used herein, "fluid" or "fluids" are liquids. Preferably the Fluids are substantially incompressible fluids, such as water.

Typically, the slurry piping system connects a blast pot comprising the slurry to a slurry/gas mixer. In certain embodiments of the wet abrasive blasting system, the blast pot contains a mixture of a solid particulate and a fluid (hereinafter "slurry"), and pressure in the blast pot causes the slurry to be conveyed through the slurry piping system at a desired flow rate from the blast pot to the mixer. The pressurized gas piping is connected to a source of pressurized gas in order that the gas may be conveyed through the gas piping system to the slurry/gas mixer and is capable of conveying the desired flow rate of pressurized gas to the mixer. The three-phase blasting system exits the mixer into the blast hose.

Typically, the gas will be air and the fluid will be water, but other gases and fluids may be used. In addition, additives may be added to the fluid or the gas, as desired. The fluid is mixed with an abrasive media in the blast pot to form the slurry.

The abrasive media of the slurry may be any desired non-floating particulate matter capable of being transferred as a slurry through the system. For example, the abrasive media may include media in the range of United States Standard Sieve Screen Size 100µ~10µ. The media and water are mixed into the pressure vessel—the ratio is inconsequential as long as the slurry may be pushed through the slurry piping system fairly evenly and consistently. The cone-shape of the bottom of the vessel and the fact that the media is heavier than water causes the mix (known as slurry) to funnel into a hose or pipe that connects the pressure vessel to the input piping of the control panel.

The slurry piping system and/or the pressurized gas piping system may comprise pipe and other components as defined above. The size of the piping system depends on the size and capacity of the wet blasting system. Larger piping is needed to make the greater flow rate of larger systems. Typically, pipes have an outside diameter, and the nominal internal cross-sectional flow area defines the pressure drop in the piping systems. The components for a specific sized pipe typically have a smaller internal cross-sectional area than the piping system itself. In embodiments of the wet blasting system, at least a portion of the pipe has a nominal internal cross-sectional flow area, and the other components have an internal cross-sectional flow area that is substantially similar to the nominal cross-sectional flow area such that the cross-sectional area of the components are within 25% of the internal cross-sectional area of the pipe. In other embodiments, the other components have an internal cross-sectional flow area that is within 15% of the internal cross-sectional area of the pipe; in other embodiments, the other components have an internal cross-sectional flow area that is within 10% of the internal cross-sectional area of the pipe.

If the piping system comprises sections of pipe with different cross-sectional flow areas, substantially all of the pipe should also be within 25% of the internal cross-sectional flow area of each other, or alternatively within 15% or even 10%. All comparisons are based upon the pipe with the largest internal cross-sectional flow area. Pipe may have variation of cross-sectional areas based upon the manufacturing process and tolerance; however, a nominal internal cross-sectional area should be used for comparison.

In preferred endowments, the other components have an internal cross-sectional area greater than 25% less than the smallest internal diameter of any portion of pipe in the individual pipeline systems. In more preferred endowments, the other components have an internal cross-sectional area greater than 10% less than the smallest internal diameter of any portion of pipe in the individual piping systems.

For example, a standard one-inch Schedule 40 steel pipe has an outside diameter of 1.315 inches and an inside diameter of 1.049 inches. However, a typical one inch valve used for piping systems with a one-inch Schedule 40 steel pipe has a reduced inside diameter of only 0.824 inches. The ratio of the inside diameter of the valve to the inside diameter of the piping is 0.785. Ball valves are generally sized such that the internal diameter of the ball is the same size as the smaller sized pipe. For example, a ball valve for a one-inch pipe will have the similar internal diameter as a ¾ inch pipe. This causes restriction in the flow and could potentially cause the pressure oscillations experienced at the mixer of wet abrasive blasting systems, resulting in intermittent slurry flow with all of the associated disadvantages. All conventional wet blasting systems use ball valves with reduced diameter orifices. Embodiments of the wet abrasive blasting systems of the invention solve this problem.

Therefore, full port ball valves or ball valves designed for a larger pipe should be used in the wet abrasive blasting systems. The table below illustrates the differences in flow diameters between standard Schedule 40 steel pipes.

| Pipe Size, inch | Internal Pipe Diameter, inch | Standard Valve Internal Diameter, inch | Ratio of Diameters | Ratio of Flow Area |
|---|---|---|---|---|
| ¾ | .824 | .622 | 0.75 | 0.57 |
| 1 | 1.049 | .824 | 0.785 | 0.62 |
| 1½ | 1.38 | 1.049 | 0.76 | 0.58 |

Similarly, standard sized regulators and check valves have reduced internal diameters, resulting in similar flow irregularities. Without the "oversized" components, the pressure regulators and check valves may exacerbate the pressure fluctuation problems.

An embodiment of a wet abrasive system 10 is depicted in FIG. 1. This embodiment comprises a blast pot 11. The blast pot 11 comprises a conical bottom 12 with an exit 19 positioned at the lower end of the conical bottom 12. Such a blast pot 11 is advantageous for use with solid particulate or media that is heavier than the fluid, typically water, and which will not significantly rust or absorb a significant amount of the fluid to be used to the blasting operation. Media such as sponge, baking soda, crushed walnut shells, ground corn cob, and plastics have densities less than water and will float and/or absorb water. Such media may be used in a blast pot with an exit at the top of the blast pot, such as a conical top, for example. Blast pots of other configurations may also be used in the wet abrasive systems, such as pots with flat or elliptical bottoms or tops or other desired shapes.

The blast pot may further be comprised of a bung, valve, flanged top, or other sealing mechanism that allows the blast pot to be purged of gas and pressurized by a source of pressurized fluid, such as a pump 14 or other source of pressurized fluid. Thus, the system may also include a pressure vessel similar to conventional dry-blasting; however, unlike conventional dry-blasting, the vessel is pressurized by a fluid, such as water, and there is substantially no air in the vessel during the blasting operation. Air trapped in the blast pot may result in pressure fluctuations because air is compressible, while water is substantially incompressible. The pump 14 shown in FIG. 1 is an air-operated pump. An air-operated pump may be convenient for use in wet abrasive blasting systems as it may be operated from the same compressed air used to connect to the pressurized gas piping. However, the fluid pump may be powered by any source, such as electricity, for example. The media and water are mixed into the blast pot and the slurry ratio is determined by the size of the individual particle. The slurry ratio depends on the blasting operation to be performed and the material of the substrate to be cleaned or stripped, as well as other factors. The cone-shaped bottom of the vessel and the fact that the media is typically heavier than water causes the slurry to funnel into a hose or pipe that connects the pressure vessel to the input piping of the control panel. In this manner, the slurry may be pumped or pushed into the mixer to be combined with the pressurized air to form the abrasive spray. The abrasive spray is a combination of solid and liquid (from the slurry) and gas (from the pressurized gas source).

The wet abrasive blasting system 10 of FIG. 1 further comprises a slurry piping system 15 connecting the blasting pot 11 to the mixer 20. The slurry piping system 15 comprises pipe 16 and other components, including elbows 19 (in this embodiment both 90 degree elbows and 45 degree elbows are used), a manual shut-off valve 17, and an air operated shut-off valve 18. All of the components have a similar internal flow area as defined above and thus are capable of supplying a consistent slurry pressure to the mixer during operation without resulting in significant cavitation or other pressure fluctuations. Other embodiments of the slurry piping system of the wet abrasive blasting system may or may not include these components and/or may include other components.

The wet abrasive blasting system 10 of FIG. 1 further comprises a pressurized gas piping system 21. In this embodiment, the pressurized gas piping system 21 comprises a compressed air connector 22 capable of connecting the gas piping system 21 to a source of pressurized gas such as, but not limited to, an air compressor or a pressurized tank, for example. The pressurized gas system 21 further comprises pipe 23, a pressure regulator 24, and a check valve 25. Other embodiments of the pressurized gas system of the wet abrasive system may or may not include these components and may or may not include other components.

A check valve in the air supply piping system presents back flow of the slurry into the gas piping system. A check valve in any of the piping systems may be a flapper check valve, a weighted check valve, or a spring loaded check valve, for example. Preferably, in certain embodiments, the check valve may have a cracking force of approximately 2 psi or a cracking force of greater than 2 psi. Further, to mitigate the risk of slurry entering the check valve and preventing the valve from closing and/or to assist slurry from being cleared from the check valve, the check valve may further be installed in a vertical position with the flow of the pressurized air in a downward direction. Further, the check valve may be installed in a position above the mixer. In contrast, in some conventional wet abrasive piping systems, the check valve is installed in a horizontal position. The horizontal position contributes to filling of the gas piping system with slurry.

To properly mix with the pressurized air, the slurry may be forced into the control panel or mixer at a force substantially equal to or greater than the force of the compressed air (the back pressure) as it passes through the slurry piping system and across the connection point of the slurry's piping into the mixer with the compressed air, on its way to and through the blast hose 26 and the blast nozzle 27.

Figure 2:
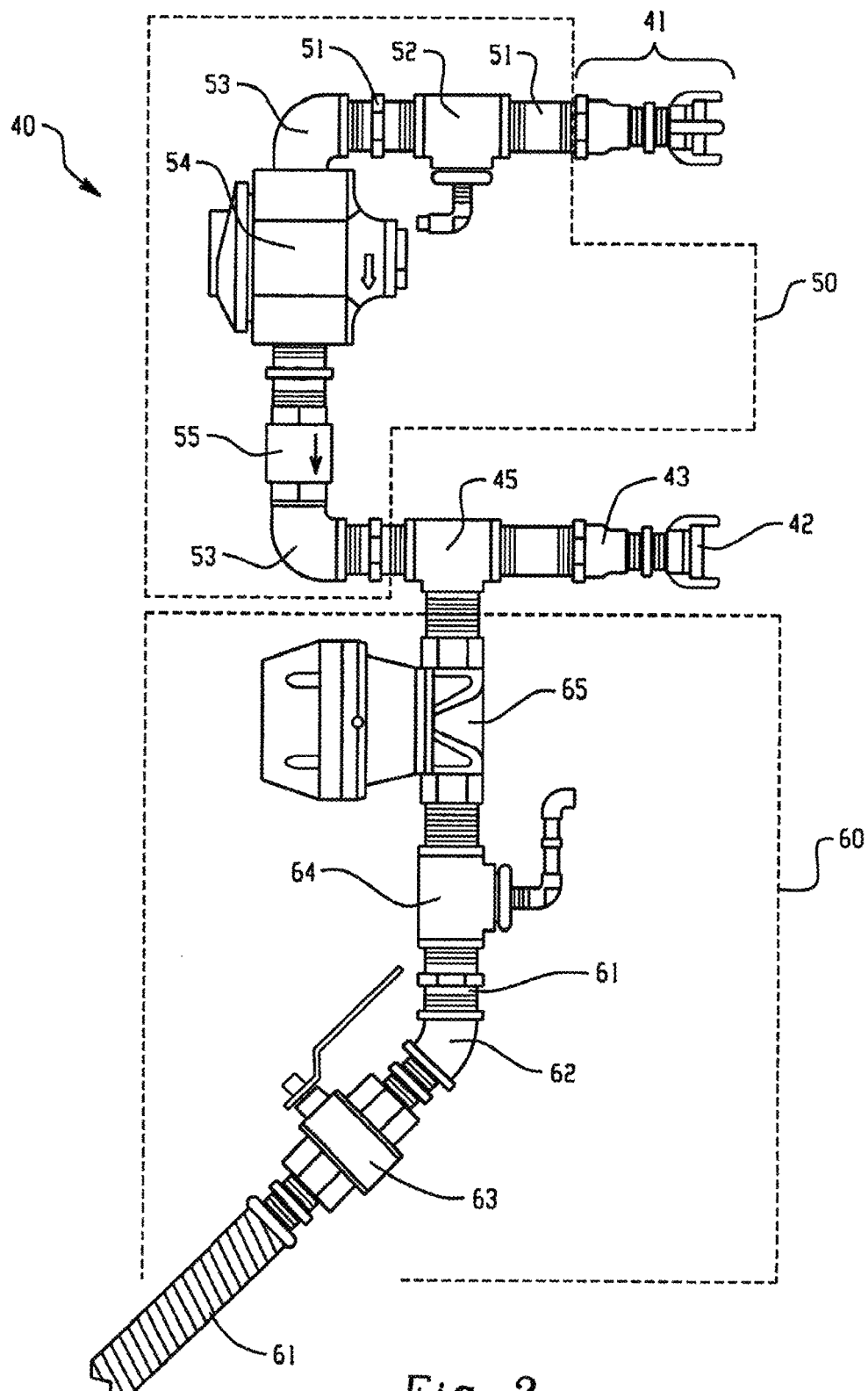
FIG. 2 is a drawing of an embodiment of the piping and control of a wet abrasive blasting system.

FIG. 2 shows a piping system 40 that may be provided in embodiments of a wet abrasive blasting system. The piping system 40 comprises a gas piping system 50 and a slurry piping system 60. The gas piping system 50 and the slurry piping system 60 are both connected to mixer 45. A pressurized gas flowing through the gas piping system 50 is combined with slurry flowing through the slurry piping system 60 in the mixer 45 to produce a three phase flow to the blast outlet 42.

A source of pressurized gas may be connected to the piping system 40 at the high-pressure, compressed air inlet 41. The high-pressure compressed air inlet 41 comprises a connector such as a hose connector and may comprise piping and other piping components. The high-pressure compressed air inlet 41 connects the source of pressurized gas to the gas piping system 51. In some embodiments, the piping system 40 may not comprise a high-pressure compressed air inlet 41 as the source of pressurized gas may be hard-piped directly to the gas piping system 50, for example.

The gas piping system 50 may comprise piping and other components to connect the source of pressurized gas to the mixer 45. The gas piping system 50 may comprise pipes or hose 51, tees for connecting sensors 52, elbows 53 including 90's and 45's, for example, regulators 54, check valves 55, control valves, shutoff valves, as well as other components. The components and the pipe have substantially similar internal cross-sectional area for flow, as previously described.

The slurry piping system 60 may comprise piping and other components to connect the blast pot to the mixer 45. The slurry piping system 60 may comprise pipes or hose 61, tees for connecting sensors 64, elbows 62 including 90's and 45's, for example, regulators, check valves, control valves, manual shutoff valves 63, air controlled shutoff valves 65, as well as other components. The components and the pipe have substantially similar internal cross-sectional area for flow, as previously described. The slurry piping system may have the same or different internal cross-sectional area as the gas piping system.

After the mixer, the three phase mixture flows to the blast outlet which may also comprise pipe, other components 43 and a connector 42. The connector may be used to connect the blast hose to the piping system 40. Embodiments of the invention provide a consistent three phase flow to the blast hose capable of producing an efficient blast operation.

To create a consistent flow of slurry, the blast pot typically may be maintained at a pressure in the range from approximately 40 psi to approximately 140 psi or greater. A water pump is used to fully fill (remove substantially all of the air) the pressure vessel (which already contains media) with water. The blast pot further comprises a means to vent the air from within the blast pot during this fill process to assist in removing substantially all of the gas or air. Once the air is expelled, a sealing valve or bung is used to seal the blast pot substantially free of compressible gas. As the water pump continues to pump, water pressure will develop in the blast pot or pressure vessel. The pump pressure maintains the pressure in the blast pot and during operation forces the slurry into the mixer via the slurry piping system. The slurry piping system may be comprised of a manually operated ball-valve, which allows the pressure in the vessel to be isolated from the control panel during the fill process. The ball valve is also used for clean-out purposes, the ability to safely reuse the media, and for wash-down purposes, which may be some of the added features to a working wet abrasive blasting system.

The driving force of the slurry through the spray nozzle of the wet abrasive blast system may be provided by a high-volume (40~900 CFM, for example) air compressor attached to the pressurized piping system. The pressure at which the compressed air is delivered to the mixer may be controlled by an air regulator designed to handle the volume of air being supplied by the compressor.

As previously discussed, the regulated air may be plumbed through a vertical check-valve with a cracking force of approximately 2 psi. The check-valve is designed to be in the vertical position and, in some embodiments, positioned at least two inches above the height of where the slurry and air are mixed. Such an arrangement effectively blocks feed-back of slurry from getting into the air regulator and air control circuitry.

An air-controlled shut-off valve may also be incorporated in the slurry piping system so the operator has the ability to simultaneously turn off the pressurized air supply and the slurry shut-off valve by means of a "dead man" switch at the blast nozzle or other switch. This action prevents slurry being forced up into the pressurized air piping system (while not blasting) due to the water pressure's force in the pressure vessel.

In operation, the compressed air "powers through" the slurry being forced into the air/slurry stream. It is this action that causes the slurry to be "picked up" and propelled through the piping, the blast hose, and the nozzle. The mixture of compressed air, water, and media is accelerated by the action of the nozzle and becomes the working blast used for cleaning, stripping, and removing unwanted coatings or rust.

Propulsion is effectively enhanced due to the water mixed with the media (slurry). The water serves both as an aid to the compressed air to encapsulate and transport the media and as a dust suppressant when the media is blasted out of the nozzle and onto the substrate. The water mixed with the media (slurry) also serves the purpose of "lubricating" the interior of the blast hose so the media can travel more efficiently in a "stream" rather than travelling dry through the blast hose, as is done in dry blasting systems.

In one embodiment, the wet abrasive blasting system comprises a vertical check-valve located more than two inches above the entry height of the slurry into the blast stream. This design takes advantage of gravity and space to help reduce the possibility of slurry back-feeding into the pressurized air piping system. Although other wet-blast systems exist, the majority of these systems inject water at the nozzle, thus losing many of the effective features of this design. The fact that this wet abrasive blasting system mixes the media and the water initially in the pressure vessel and comprises a unique flow pattern of the compressed air slurry piping system, pressurized air system, and how the gas is mixed with the slurry, present major solutions to the efficient transport of the media through the blast hose and nozzle.

Advantages

1 The dryness of the compressed air is not an issue in such embodiments of the wet abrasive blasting system as it is in conventional dry-blast systems or in wet-blast systems that inject water at the nozzle.
2 The increased efficiency derived by using the water to act together with the compressed air to transport the media through the blast hose efficiently.
3 The removal of substantially all of the air from the pressure vessel allows for a consistent pressure in the vessel because water does not compress as does air. Therefore, the system does not produce an accumulator effect, which can produce inconsistent pressure and flow rates at the nozzle and mixer.
4 The unused slurry can easily be saved from the pressure vessel at the end of the blasting process and reused in its wet form without the concern of accumulation of moisture, which may cause the dry media to agglomerate and clog the system, as can happen in a conventional dry-blast system.

Because the wet abrasive blasting system is more efficient, the system can be used at lower pressures and/or flow rates than can conventional dry-blasting systems, thus substantially reducing the fatigue factor to the operator and operating costs. The water in the slurry may also act as a dust shield and entraps the dust produced from the product being removed as well as the dust that would normally be generated from the media itself. The water "shield" also reduces "bounce-back," so the operators are able to perform their operation with minimal protective clothing. Importantly, containment issues, although not eliminated, are substantially reduced because the encapsulated dust falls to the ground rather than becoming air-borne. Therefore, the system is more environmentally and user friendly.

As we described earlier, the pressurized blast pot (pressure maintained by a water pump in a system from which all of the air has been vented) is just one component in the wet abrasive blasting system, the purpose of which is to create positive flow of slurry through the mixer and into the air stream. Obviously, once the air-controlled slurry shut-off valve is opened, the pressure in the pot and the pressure in the airstream will attempt to equalize. Typically, a higher pressure in the blast pot than the pressure in the air stream is due to the resistance of the forming slurry and the setting of the water pump that provides consistent positive flow of slurry to the mixer. In certain embodiments, the water pump's pressure output regulator may be set at least 15~20 psi higher than the intended blast pressure. Testing has shown that as long as the pressure in the blast pot is maintained at or above the blast pressure, the slurry is forced into the air stream rather than air being forced backwards toward the blasting pot. The pressure in the blasting pot (once initially set) may be maintained by an adjustable flow-control valve. The setting of this valve predictably controls the volume of slurry being forced into the air stream. As this valve injects water into the top of the pot (using pressurized water from the water pump), the same amount of slurry is forced into the air stream based on the principle that the water in the pot cannot be compressed and, therefore, additional water in must equal the same volume of slurry out.

Additionally, testing has shown that the size of the slurry inlet into the mixer may be equal to or greater than the size of the air stream's piping inlet in order to require only 10 psi differential in the pot's pressure above the gas pressure. If the piping of the pressurized gas stream was greater than the inlet size of the slurry, the pot's pressure would have to be increased by the same ratio times 1.1. Also critical, as shown by testing many different combinations, the blast hose's internal size and the size and type of blast nozzle are critically related to each other and over-sizing them (in relation to the cubic feet per minute of the compressor) will cause a loss in pressure and efficiency. The blast hose/nozzle combination produces both the back pressure on the system (at the mixer) and it also controls the diameter of the spray pattern. As the nozzle's size is decreased, higher blast pressures may be generated and a resulting higher level of aggressive blasting may be performed. As the nozzle's size is increased, a larger spray pattern may be achieved with less pressure and less aggressive blasting. Both conditions are desired and determined by the application and can be achieved by the wet abrasive blasting system of the invention.

Using the wet abrasive blasting system of the invention, the flow and pressure of the slurry must be matched with the desired actual cubic feet per minute (CFM) of the pressurized air for a particular wet abrasive blasting system. Consequently, the inventor has designed and tested multiple-sized piping systems for different flow rates of air.

A further embodiment of the wet abrasive blasting system comprises a pressurized gas piping system that connects a source of pressurized gas to the mixer. The mixer is the point in the wet abrasive blasting system, wherein a slurry stream and the pressurized gas stream are combined to form a three-phase blasting stream. The pressurized gas is provided to the mixer a designated pressure to balance with the pressure of the slurry flow. To maintain the substantially constant pressure, the pressurized gas piping system comprises an air regulator. The pressure setting of the air regulator may be manually or automatically set based upon the pressure in the slurry pot or the desired blasting pressure. A portion of the pipe in the pressurized gas piping system has an internal cross-sectional flow area and the air regulator has a minimum orifice internal cross-sectional flow area that is greater than 25% less than the internal cross-sectional flow area of the pipe. In another embodiment, the air regulator has a minimum orifice internal cross-sectional flow area that is within 15% of the internal cross-sectional flow area of the pipe and, in a still further embodiment, the air regulator has a minimum orifice internal cross-sectional flow area that is greater than 10% less than the internal cross-sectional flow area of the pipe.

An additional embodiment of the wet abrasive blasting system comprises a check valve in the pressurized gas piping system. A portion of the pipe has an internal cross-sectional flow area and the check valve have a minimum orifice internal cross-sectional flow area that is greater than 25% less than the internal cross-sectional flow area of the pipe. In another embodiment, the check valve has a minimum orifice internal cross-sectional flow area that is within 15% of the internal cross-sectional flow area of the pipe and, in a still further embodiment, the check valve has a minimum orifice internal cross-sectional flow area that is greater than 10% less than the internal cross-sectional flow area of the pipe. As stated above, the check valve may be any type of check valve. For example, the check valve may be a spring-loaded check valve. In spring loaded check valves as well as other check valve designs, the cracking forces may be adjusted based upon the spring force. For example, the check valve has a cracking force of greater than 2 psi.

In some embodiments, the wet abrasive blasting system comprises a mixer and a check valve installed in a horizontal position. The check valve is in a piping system connecting the check valve to the mixer. In a further embodiment of the wet abrasive blasting system, the check valve has a cracking pressure of greater than 2 psi and a flow area within 25% of the flow area of a pipe in the piping system. In still further embodiment and in any of the previous embodiments, the check valve is installed in the piping system in a horizontal position and/or positioned at the same elevation as the mixer.

The embodiments of the described wet abrasive blasting systems, piping systems, and methods are not limited to the particular embodiments, method steps, and materials disclosed herein as such formulations, process steps, and materials may vary somewhat. Moreover, the terminology employed herein is used for the purpose of describing exemplary embodiments only and the terminology is not intended to be limiting since the scope of the various embodiments of the present invention will be limited only by the appended claims and equivalents thereof.

Therefore, while embodiments of the invention are described with reference to exemplary embodiments, those skilled in the art will understand that variations and modifications can be affected within the scope of the invention as defined in the appended claims. Accordingly, the scope of the various embodiments of the present invention should not be limited to the above discussed embodiments, and should only be defined by the following claims and all equivalents.

The invention claimed is:

1. A wet abrasive blasting system, comprising:
   a mixer combining a slurry stream and a pressurized gas stream to form a three-phase blasting stream;

slurry piping system that connects a source of pressurized slurry to the mixer, wherein the slurry piping system comprises pipes and other components; and pressurized gas piping system that connects a source of pressurized gas to the mixer, wherein the pressurized gas piping system comprising comprises pipes and an air regulator; wherein a portion of the pipe has an internal cross-sectional flow area and the air regulator has a minimum orifice internal cross-sectional flow area that is greater than 25% less than the internal cross-sectional flow area of the pipe.

2. The wet abrasive blasting system of claim 1, wherein the air regulator has a minimum orifice internal cross-sectional flow area that is within 15% of the internal cross-sectional flow area of the pipe.

3. The wet abrasive blasting system of claim 1, wherein the air regulator has a minimum orifice internal cross-sectional flow area that is greater than 10% less than the internal cross-sectional flow area of the pipe.

4. The wet abrasive blasting system of claim 1, wherein the source of pressurized slurry is a blast pot and the wet abrasive blasting system comprising a water pump in fluid communication with the blast pot such that water pressure forces slurry into the compressed air circuit.

5. The wet abrasive blasting system of claim 4, wherein the blast pot is substantially full of water during a blasting operation and the water pump is capable of maintaining pressure in the blast pot.

6. The wet abrasive blasting system of claim 5, wherein the source of pressurized gas is an air compressor.

7. A wet abrasive blasting system, comprising:

a mixer;

a check valve installed in a horizontal position; and piping system connecting the check valve to the mixer, wherein the check valve has a cracking pressure of greater than 2 psi, a flow area within 25% of the flow area of a pipe in the piping system, and is positioned at the same elevation as the mixer.

8. A wet abrasive blasting system, comprising:

a mixer combining a slurry stream and a pressurized gas stream to form a three-phase blasting stream;

slurry piping system that connects a source of pressurized slurry to the mixer, wherein the slurry piping system comprises pipes and other components; and pressurized gas piping system that connects a source of pressurized gas to the mixer, wherein the pressurized gas piping system comprising comprises pipes and a check valve; wherein a portion of the pipe has an internal cross-sectional flow area and the check valve have a minimum orifice internal cross-sectional flow area that is greater than 25% less than the internal cross-sectional flow area of the pipe.

9. The wet abrasive blasting system of claim 8, wherein the check valve has a minimum orifice internal cross-sectional flow area that is within 15% of the internal cross-sectional flow area of the pipe.

10. The wet abrasive blasting system of claim 8, wherein the check valve has a minimum orifice internal cross-sectional flow area that is greater than 10% less than the internal cross-sectional flow area of the pipe.

11. The wet abrasive blasting system of claim 8, wherein the check valve is a spring-loaded check valve.

12. The wet abrasive blasting system of claim 11, wherein the check valve has a cracking force of greater than 2 psi.

13. The wet abrasive blasting system of claim 8, wherein the check valve is installed in a horizontal position.

14. The wet abrasive blasting system of claim 8, wherein the check valve is installed at the same height as the mixer.

\* \* \* \* \*

UNITED STATES PATENT AND TRADEMARK OFFICE
CERTIFICATE OF CORRECTION

PATENT NO. : 10,076,823 B2  
APPLICATION NO. : 15/899737  
DATED : September 18, 2018  
INVENTOR(S) : Keith Eliason and Nicholas K. Studt Page 1 of 1

It is certified that error appears in the above-identified patent and that said Letters Patent is hereby corrected as shown below:

On the Title Page

Item [72],  
Delete "Nicolas"  
Insert -- Nicholas --

Signed and Sealed this  
Twenty-fourth Day of March, 2020

Andrei Iancu  
*Director of the United States Patent and Trademark Office*